United States Patent
Lee et al.

(10) Patent No.: US 9,348,412 B2
(45) Date of Patent: May 24, 2016

(54) METHOD AND APPARATUS FOR OPERATING NOTIFICATION FUNCTION IN USER DEVICE

(71) Applicant: Samsung Electronics Co., Ltd., Suwon-si, Gyeonggi-do (KR)

(72) Inventors: Kihuk Lee, Yongin-si (KR); Jinhee Na, Seoul (KR); Youngkwon Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/287,873

(22) Filed: May 27, 2014

(65) Prior Publication Data
US 2014/0354538 A1    Dec. 4, 2014

(30) Foreign Application Priority Data
Jun. 3, 2013 (KR) .................. 10-2013-0063261

(51) Int. Cl.
| | | |
|---|---|---|
| H04M 1/725 | (2006.01) | |
| G06F 3/01 | (2006.01) | |
| H04M 19/04 | (2006.01) | |
| H04M 1/57 | (2006.01) | |

(52) U.S. Cl.
CPC ............ *G06F 3/013* (2013.01); *H04M 1/72519* (2013.01); *H04M 19/04* (2013.01); *H04M 1/57* (2013.01); *H04M 1/72552* (2013.01); *H04M 1/72563* (2013.01); *H04M 2250/52* (2013.01)

(58) Field of Classification Search
CPC .............. G06F 3/013; H04M 1/72519; H04M 2250/52; H04M 1/72552; H04M 1/72563; H04M 1/57
See application file for complete search history.

(56) References Cited

U.S. PATENT DOCUMENTS

2010/0214395 A1* 8/2010 Haussler .................. 348/51
2014/0256438 A1* 9/2014 Grant et al. .............. 463/36

FOREIGN PATENT DOCUMENTS

JP     2012-22720 A    2/2012

\* cited by examiner

*Primary Examiner* — Sahlu Okebato
(74) *Attorney, Agent, or Firm* — Jefferson IP Law, LLP

(57) ABSTRACT

A method and an apparatus for operating a reception notification function in a user device are provided. The method includes detecting a face of a user in images collected through a camera, when a notification event is detected, and executing a notification function in either of a silent mode and a vibration mode when the notification event is detected, when a face of a user is detected in images collected through a camera.

10 Claims, 8 Drawing Sheets

<401>

METHOD AND APPARATUS FOR OPERATING NOTIFICATION FUNCTION IN USER DEVICE

CROSS-REFERENCE TO RELATED APPLICATION(S)

This application claims the benefit under 35 U.S.C. §119 (a) of a Korean patent application filed on Jun. 3, 2013 in the Korean Intellectual Property Office and assigned Serial number 10-2013-0063261, the entire disclosure of which is hereby incorporated by reference.

TECHNICAL FIELD

The present disclosure relates to a method and an apparatus for operating a notification function in a user device. More particularly, the present disclosure relates to a method and an apparatus for operating a notification function in a user device, which operates a notification mode in such a manner as to discriminate between multiple notification modes according to whether a face of a user is detected.

BACKGROUND

Currently, with the advancement of the communication technology, portable terminals, such as a smart phone, a tablet Personal Computer (PC) and the like, have come into wide use. Because portable terminals have a convenience of use and may be easily carried, they have been used in a wide variety of fields.

A portable terminal transmits and receives data, such as a telephone call, a message, a messenger and the like, to and from another terminal through a wireless communication unit. When receiving data through the wireless communication unit, the portable terminal provides a user with a notification service which notifies the user of the reception of data. For example, when a display unit of the portable terminal is in an off state during the reception of a message, the portable terminal causes the display unit to turn on, displays information on the reception of a message in a pop-up form through the display unit, and provides reception notification through sound and/or vibration. Also, after the user reserves function execution for a particular time point by using the portable terminal, the portable terminal provides the user with notification information through a notification function.

However, when the user receives a telephone call or a message while the user uses the portable terminal or is viewing a screen of the portable terminal, an additional notification effect of a sound or vibration notifying of the reception of a telephone call or a message may be inconvenient to the user and people around the user. For example, when the user performs a telephone call, the message reception notification sound or vibration effect interrupts the telephone call of the user. Also, the user is inconvenienced in that the user has to change the reception notification sound to a silent mode or a vibration mode according to a change of location. Therefore, in addition to a separate key input, there is a need for a method capable of changing a reception notification mode according to whether the portable terminal is used.

Accordingly, a method and an apparatus capable of efficiently operating a notification function in a user device according to whether a user is looking at the user device are desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus capable of efficiently operating a notification function in a user device according to whether a user is looking at the user device.

Another aspect of the present disclosure is to provide a method and an apparatus for operating reception notification in a user device, which may change a notification function of the user device to a silent mode according to whether a face of a user is detected while the user operates the user device or when a notification event is detected.

In accordance with another aspect of the present disclosure, a method for operating a notification function in a user device is provided. The method includes detecting a face of a user in images collected through a camera, when a notification event is detected, and executing either of a silent notification function and a vibration notification function when a notification event is detected, when the face of a user is detected in images collected through a camera.

In accordance with another aspect of the present disclosure, a method for operating a notification function in a user device is provided. The method includes executing an application supporting the notification function, and detecting a face of a user in images collected through a camera in a state of executing the application. The mode of the notification function is changed to one of a silent mode and a vibration mode when the face of the user is detected, and the notification function is executed in a preset notification mode when the face of the user is not detected.

In accordance with another aspect of the present disclosure, a user device is provided. The user device includes a wireless communication unit configured to transmit/receive one of a call and particular data, a camera configured to collect images, an audio processing unit configured to output a reception sound, and a control unit configured to execute a notification function of notifying a user of the reception of one of the call and the particular data in either of a silent mode and a vibration mode, if a face of the user is detected in the images collected through the camera when a notification event is detected.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description in conjunction with the accompanying drawings, in which.

Throughout the drawings, it should be noted that like reference numbers are used to depict the same or similar elements, features, and structures.

DETAILED DESCRIPTION

Figure 1:
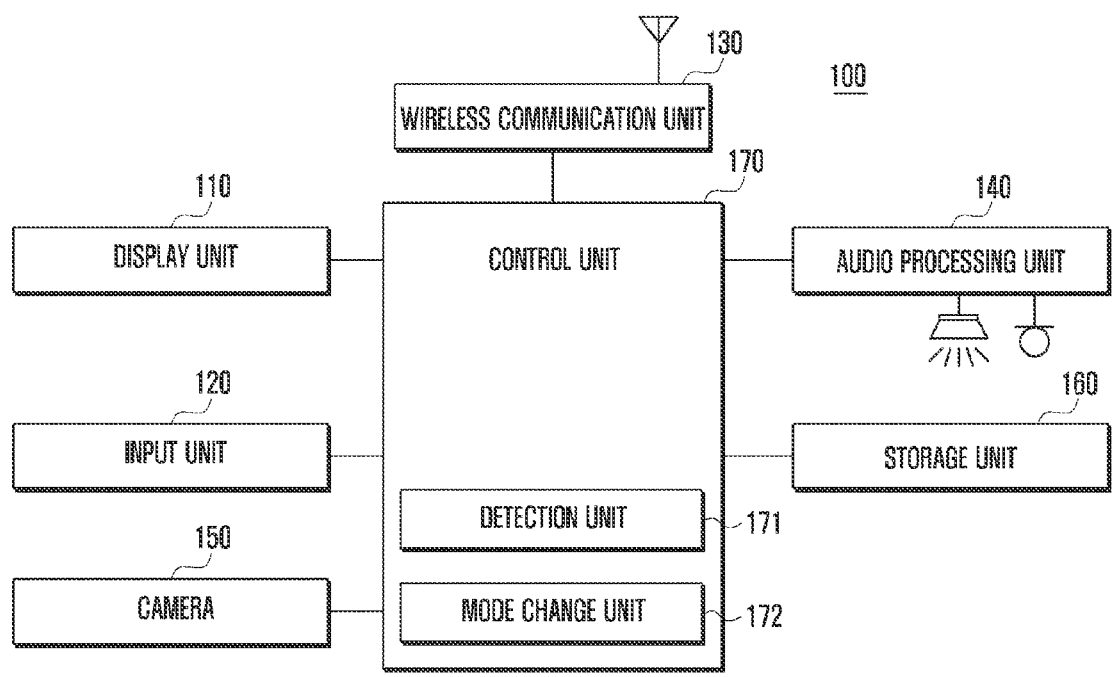
FIG. 1 is a block diagram illustrating a configuration of a portable terminal according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a method and an apparatus for operating a notification function in a user device, according to various embodiments of the present disclosure, will be described in detail with reference to the accompanying drawings. Prior to making a detailed description of the present disclosure, the terms and words used in the present specification and claims should not be interpreted as being limited to their typical meaning based on the dictionary definitions thereof, but should be interpreted to have the meaning and concept relevant to the technical spirit of the present disclosure. Accordingly, the various embodiments described in the present specification and constructions shown in the drawings are only embodiments of the present disclosure, and do not represent all technical spirits of the present disclosure. Therefore, it should be understood that various equivalents and modified various embodiments capable of replacing these various embodiments may exist at the time when this application was filed. Also, in the accompanying drawings, some elements are exaggerated, omitted, or schematically illustrated, and the size of each element does not entirely reflect an actual size. Accordingly, the inventive concept is not limited to relative sizes or distances drawn in the accompanying drawings.

When operating as a terminal, a user device according to various embodiments of the present disclosure supports an operation of processing a mode of a notification function into a silent mode according to whether a face of a user is detected. Particularly, various embodiments of the present disclosure support a function of limiting the effect feedback (e.g., the output of audio or the generation of vibration) of notification and providing only time feedback according to whether the user is gazing at the user device. When receiving the text, the user device supports a function of limiting the display of the contents of text according to whether the face of the user is detected. When the notification function is set for the user device, the user device determines whether the face of the user has been detected, and supports a function of limiting an incorrect operation of a user input.

In various embodiments of the present disclosure, the term "notification function" refers to a function of notifying the user of the occurrence of an event when a function generated in process of operating a terminal is executed. The notification function provides the user with a notification service, such as visual feedback (i.e., the display of notification information) and effect feedback (e.g., the output of a ring tone, the generation of vibration, and the like), through a display unit in response to a notification event. Examples of the notification event may include a reception notification event (e.g., message reception, call reception, and the like) and a function notification event (e.g., schedule alarm, time alarm, and the like). Also, modes of the notification function may be divided into a ring tone mode, a vibration mode, a silent mode.

In various embodiments of the present disclosure, the term "silent notification function" refers to a function of limiting effect feedback, such as the output of audio, the generation of vibration, and the like. and providing only visual feedback through the display unit when a notification event occurs. For example, in various embodiments of the present disclosure, the silent notification function may be interpreted as a case in which a silent mode is set for the notification function.

A method and an apparatus according to various embodiments of the present disclosure may be applied to a portable terminal. It is obvious that examples of the portable terminal may include a mobile phone, a smart phone, a tablet Personal Computer (PC), a hand-held PC, a Portable Multimedia Player (PMP), a Personal Digital Assistant (PDA), and the like. Hereinafter, a case will be described in which the method and the apparatus for operating a notification function in the user device according to various embodiments of the present disclosure are applied to the portable terminal.

FIG. 1 is a block diagram illustrating a configuration of a portable terminal according to an embodiment of the present disclosure.

Referring to FIG. 1, the portable terminal 100 according to an embodiment of the present disclosure includes a display unit 110, an input unit 120, a wireless communication unit 130, an audio processing unit 140, a camera 150, a storage unit 160, and a control unit 170, but is not limited thereto.

The display unit 110 displays various function screens required in process of operating the portable terminal. Under the control of the control unit 170, the display unit 110 may convert image data, which has been received as input from the control unit 170, into an analog signal, and displays the converted analog signal. The display unit 110 may include a display panel, which provides various screens according to the operation of the portable terminal, and a touch panel which is mounted on a front surface or a rear surface of the display panel and supports the generation of an input event. The display unit 110 may support a landscape mode or a portrait mode according to a rotation direction (or a grip direction) of the portable terminal.

In an embodiment of the present disclosure, when a notification event (e.g., message reception, call reception, a morning call function execution request, and the like) has been detected, the display unit 110 supports a function of providing a visual feedback screen in response to the detected notification event. Particularly, under the control of the control unit 170, the display unit 110 may display notification information in response to the notification event. The display unit 110 may output various screens for a notification function. For example, the display unit 110 may output an incoming call reception screen, a message reception notification screen, a display screen of the contents of a message, a schedule notification screen, a time (e.g., a morning call, and the like) notification screen, a notification setting screen, and the like.

The input unit 120 generates various input signals required for operating the portable terminal. The input unit 120 generates signals related to a user setting and the function control of the portable terminal, and delivers the generated signals to the control unit 170. The control unit 170 controls functions according to such input signals in response to the relevant input signals. Also, when the display unit 110 includes the touch panel, the display unit 110 may operate as the input unit 120. In this case, an input signal for operating the portable terminal may be generated through the touch panel.

The wireless communication unit 130 performs a communication function of the portable terminal. The wireless communication unit 130 forms a communication channel between the wireless communication unit 130 and a mobile communication network, which is capable of being supported by the wireless communication unit 130, and performs communication functions, such as voice communication, image communication and data communication. The wireless communication unit 130 may include a Radio Frequency (RF) transmitter for upconverting a frequency of a signal to be transmitted and amplifying the frequency-upconverted signal, an RF receiver for low-noise amplifying a received signal and downconverting a frequency of the low-noise amplified signal, and the like. In an embodiment of the present disclosure, the wireless communication unit 130 supports communication functions, such as the transmission/reception of a telephone call, the transmission/reception of a message, the transmission/reception of a messenger, and the like, between the portable terminal and another portable terminal.

The audio processing unit 140 may include a Speaker (SPK), which outputs an audio signal generated or decoded by the portable terminal as sound, and a Microphone (MIC) which converts, into an electrical signal, an audio signal received as input from the outside in order to support a voice telephone call, a video telephone call, a recording function and the like. The audio processing unit 140 may include a coder/decoder (codec). The codec may include a data codec for processing packet data and the like, and an audio codec for processing audio signals, such as voice and the like. The audio processing unit 140 supports the output of an audio effect sound or a guide voice according to a preset notification mode in response to a notification event.

Although not illustrated in FIG. 1, the portable terminal 100 according to an embodiment of the present disclosure may include a vibration unit. The vibration unit may include a stepping motor and the like, and supports a function of vibrating the portable terminal during the occurrence of a notification event under the control of the control unit 170. For example, when a notification function of the portable terminal is set to a vibration mode, if a notification event is detected, the control unit 170 controls the vibration unit to vibrate the portable terminal (i.e., execute effect feedback). Accordingly, the portable terminal may provide the notification function to the user.

The camera 150 may include a camera sensor for converting an input light signal into an electrical signal, an image signal processor for converting an analog image signal captured by the camera sensor into digital data, a digital signal processor for performing image processing (e.g., scaling, noise removal, Red Green Blue (RGB) signal conversion, and the like) on a video signal in order to display the digital data provided by the image signal processor on the display unit 110, and the like. Also, according to an embodiment of the present disclosure, the camera 150 may include an infrared image sensor. In this case, the camera 150 may capture an infrared image, and may deliver the captured infrared image to the control unit 170.

In an embodiment of the present disclosure, the camera 150 collects user images, and delivers the collected user images to the control unit 170. The control unit 170 determines whether a face of the user is included in each image received from the camera 150. When the execution of a function of detecting the face of the user is requested, the camera 150 may be turned on by using a background function under the control of the control unit 170. When the camera 150 is activated by using the background function, the camera 150 delivers an image (e.g., a user image, and the like), which has been captured by an internal sensor thereof, to the control unit 170. According to an embodiment of the present disclosure, the cameras 150 may be mounted on a front surface and a rear surface of the portable terminal, respectively, but the camera 150, which is activated when a function of detecting a face is performed, may be a front camera mounted on the front surface of the portable terminal.

The storage unit 160 stores an Operating System (OS) of the user device, various applications of the user device, various data generated by the portable terminal, and the like. Examples of the data may include data generated by executing an application of the user device, and all forms of data which are generated by the user device or are capable of being received from the outside (e.g., an external server, another user device, and the like) and are capable of being stored. The storage unit 160 may store a User Interface (UI), which is provided by the user device, and various pieces of setting information required when the user device processes a function. In an embodiment of the present disclosure, the storage unit 160 stores a program supporting a notification function, and the program supporting the notification function supports a notification sound setting function and a notification display information setting function. Also, the storage unit 160 may store multiple pieces of eye pattern information for recognizing an eye of the user capable of being used when a face is detected.

The control unit 170 controls an overall operation of the user device and a signal flow between the internal elements of the user device, and processes data. The control unit 170 controls the supply of power from a battery to each of the internal elements of the user device. When power is supplied to the user device, the control unit 170 controls a booting process of the user device, and executes various application programs stored in a program area in order to execute a function of the user device according to a setting by the user.

In an embodiment of the present disclosure, the control unit 170 may control a reception notification mode of the portable terminal and an operation related to the reception notification mode by using a function of detecting a face.

The control unit 170 may include a detection unit 171 and a mode change unit 172.

The detection unit 171 supports a function of recognizing the face of the user from an image delivered by the camera 150. For example, the detection unit 171 determines whether a face image of a person is included in images collected by the camera 150. When a face image of a person is included in the images collected by the camera 150, the detection unit 171 may determine that the face of the user has been detected. The detection unit 171 detects the color of a face, the position of eyes and that of a nose, and the like, based on technologies, such as facial recognition, iris scan, facial feature tracking, thermal infrared recognition, and the like, and thereby may determine whether the face of the user is detected. When the face of the user has been detected from an image captured by the camera 150, the detection unit 171 delivers the detection of the face of the user to the mode change unit 172.

The detection unit 171 tracks an eye area of the user from a result of detecting the face, and thereby may determine whether eyes of the user gaze at the portable terminal. For example, the detection unit 171 detects a position of the eye area of the user from the user's face image, and extracts an eye pattern from the eye area. Here, the eye pattern may be data on the size of each eye, the position of each pupil, and the direction of each pupil. The detection unit 171 performs pattern matching based on the eye pattern, and determines whether the user gazes at the portable terminal Specifically, the detection unit 171 recognizes eye patterns of the user, and may divide the eye patterns of the user into an eye pattern in a case where the user gazes at the portable terminal and an eye pattern in a case where the user does not gaze at the portable terminal. The detection unit 171 delivers the extracted eye pattern information of the user to the mode change unit 172.

The mode change unit 172 controls a notification function according to whether the face of the user has been detected or the eye pattern information of the user, which has been received from the detection unit 171. When the face of the user has been detected, the mode change unit 172 performs a control operation for executing the notification function in such a manner as to change a mode of the notification function from a preset notification mode to a silent mode. In contrast, when the face of the user has not been detected, the mode change unit 172 performs a control operation for maintaining the notification function in the preset notification mode and executing the notification function in the preset notification mode. Here, the preset notification mode may be a mode which provides effect feedback such as a ring tone mode, a vibration mode or the like, or may be a mode which limits audio output such as a silent mode.

Detailed functions of the control unit according to an embodiment of the present disclosure will be described in detail with reference to FIG. 2 to FIG. 7.

Various modifications may exist according to the convergence trend of digital devices, and cannot be all enumerated. However, according to various embodiments of the present disclosure, the portable terminal 100 may further include elements, such as a sensor module for sensing information related to a position change of the portable terminal 100, a Global Positioning System (GPS) module for measuring a location of the portable terminal 100, and the like, which have not been described above. Also, it goes without saying that, in the portable terminal 100, a particular configuration may be excluded from the above-described configuration or may be replaced by another configuration according to various embodiments of the present disclosure. Further, it goes without saying that examples of the input unit 120 may include a touch pad, a trackball as well as a touch screen and a key input unit in various embodiments of the present disclosure.

Figure 2:
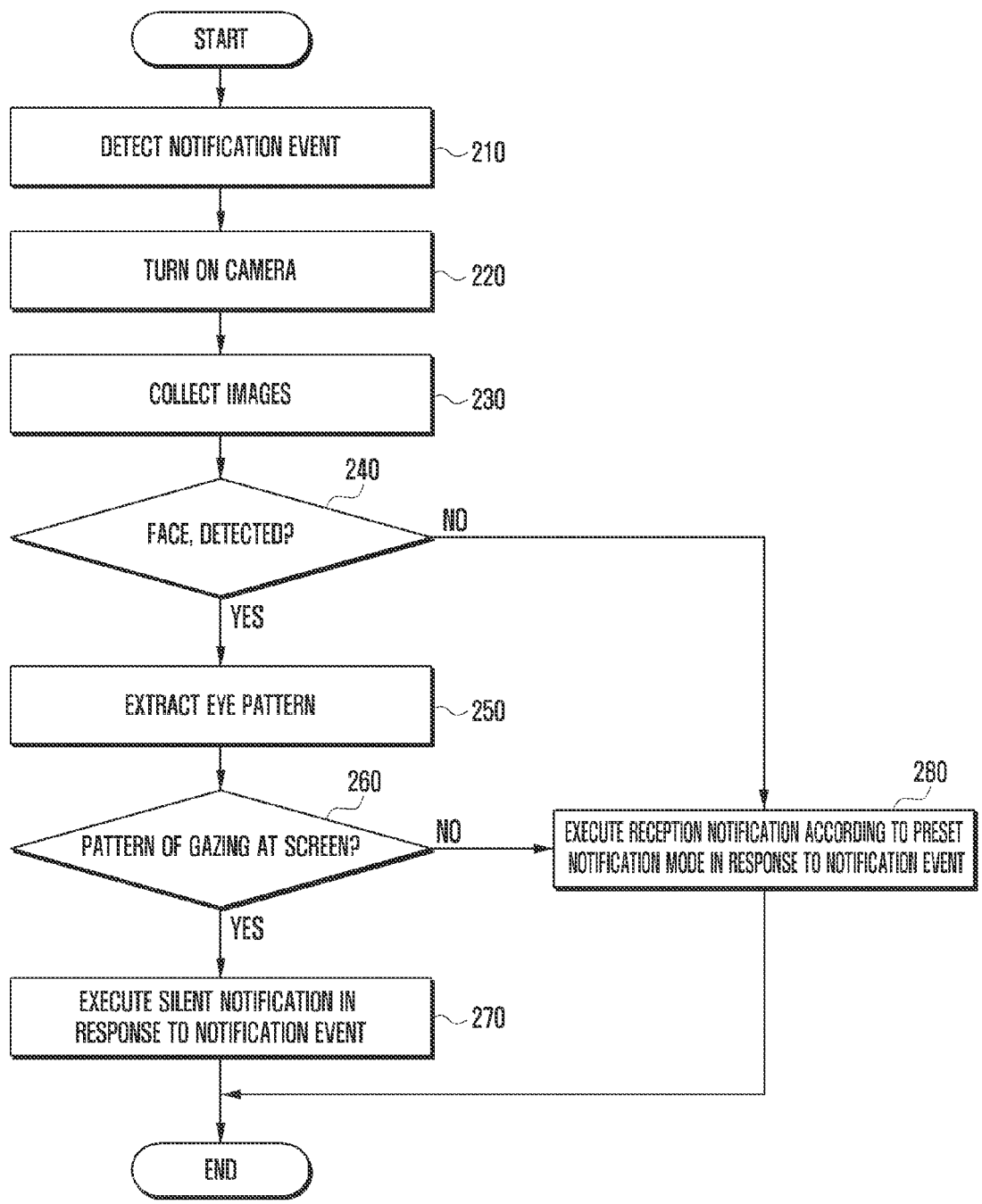
FIG. 2 is a flowchart illustrating a method for operating a notification function in a user device according to a first embodiment of the present disclosure.

FIG. 2 is a flowchart illustrating a method for operating a notification function in a user device according to a first embodiment of the present disclosure.

Referring to FIG. 2, in operation 210, the portable terminal 100 detects a notification event which notifies of the reception of data from the outside, the execution of a particular function, or the like. Here, examples of the notification event may include a reception notification event and a function notification event. Examples of the reception notification event may include reception events, such as messages, which include a Short Message Service (SMS) message, a Multimedia Messaging Service (MMS) message, an e-mail and the like, a Social Networking Service (SNS), an incoming call, feeds (e.g., Facebook and Twitter), and the like. However, various embodiments of the present disclosure are not limited thereto. Also, examples of the function notification event may include function execution events according to a setting by the user or a preset schedule, such as schedule notification, morning call notification, time notification, and the like. However, various embodiments of the present disclosure are not limited thereto.

When the notification event has been detected, in operation 220, the portable terminal 100 turns on the camera 150. At this time, the camera 150 is turned on by using a background function, and delivers an image acquired through a lens to the control unit 170. In operation 230, the portable terminal 100 acquires an image from the camera 150. In operation 240, the portable terminal 100 determines whether a face of a user is detected from the acquired image. For example, the portable terminal 100 may separate a face area of the user and a background area from the image, which has been acquired from the camera 150, by using color information, contour image information, and a technology such as facial feature tracking and the like. When the face area of the user is detected in the image acquired from the camera 150, the portable terminal 100 may determine that the face of the user has been detected. The portable terminal 100 according to an embodiment of the present disclosure detects the color of a face, the position of eyes and that of a nose, and the like based on technologies, such as facial recognition, iris scan, facial feature tracking, thermal infrared recognition, and the like, and thereby may determine whether the face of the user is detected.

When the face of the user has been detected, in operation 250, the portable terminal 100 recognizes the position of an eye area in the face area of the user, and extracts an eye pattern from the eye area. Here, the eye pattern may be data on the size of each eye, the position of each pupil, and the direction of each pupil.

In operation 260, the portable terminal 100 performs pattern matching based on the extracted eye pattern, and determines whether eyes of the user correspond to an eye pattern of gazing at the portable terminal 100. For example, the portable terminal 100 according to an embodiment of the present disclosure supports a function of recognizing a gaze direction of the eyes of the user based on the eye area of the user extracted in the image. The portable terminal 100 having an eye recognition function may store a DataBase (DB) corresponding to various pieces of eye pattern information, such as an eye pattern of gazing at a screen of the portable terminal 100, an eye pattern of not gazing at the screen thereof, an eye pattern of gazing at a lower end of the screen thereof, an eye pattern of gazing at an upper end of the screen thereof, and the like, in order to recognize an eye area of the user. The portable terminal 100 determines eye pattern information, to which matching is applied with the eye pattern of the user extracted from the face area as a reference, and may determine whether the user is gazing at the portable terminal 100. At this time, the portable terminal 100 sends a request for pattern matching with respect to the eye pattern of the user to a particular server, receives a result of the pattern matching in response to the request, and thereby may recognize a gaze direction of the eyes of the user.

When it is determined as a result of the pattern matching that the eyes of the user correspond to an eye pattern of gazing at the portable terminal 100, in operation 270, the portable terminal 100 executes a silent notification function in response to a notification event. Here, the silent notification function limits effect feedback (e.g., the generation of vibration, the output of audio, or the like) during a notification function, and may be understood as a notification function of providing only visual feedback. For example, when it is determined that the eyes of the user are gazing at the portable terminal 100 during the occurrence of a notification event, the portable terminal 100 may perform a control operation for changing a mode of the notification function to a silent mode. Then, the portable terminal 100 limits the effect feedback (e.g., the generation of vibration, the output of audio, or the like) in response to the notification event, and may output reception information (e.g., message reception, telephone call reception, and the like) on the display unit 110 or may generate vibration.

In an embodiment of the present disclosure, a case is described in which the effect feedback is limited and only the visual feedback is provided when the eyes of the user gaze at the portable terminal 100. However, various embodiments of the present disclosure are not limited thereto. According to another embodiment of the present disclosure, when the eyes of the user gaze at the portable terminal 100, an audio output may be limited and vibration may be generated, or only the visual feedback may be provided.

When it is determined as the result of the pattern matching that the eyes of the user correspond to a pattern of not gazing at the portable terminal 100, in operation 280, the portable terminal 100 executes a notification function according to a preset notification mode in response to a notification event.

For example, when a preset notification setting mode is a vibration mode or a ring tone mode, if a notification event occurs, the portable terminal 100 detects the face of the user through the camera 150. When it is determined as a result of recognizing the eyes of the user that the user does not gaze at the portable terminal 100, the portable terminal 100 executes a reception notification function in the preset notification mode. For example, when a telephone call is received, the portable terminal 100 may generate vibration, or may provide effect feedback which outputs a ring tone and visual feedback which displays telephone call reception information on the display unit 110.

In contrast, when it is determined as the result of recognizing the eyes of the user that the user gazes at the portable terminal 100, the portable terminal 100 may limit the effect feedback and may provide only the visual feedback which displays the telephone call reception information on the display unit 110. Specifically, although the vibration mode or the ring tone mode is set for the portable terminal 100 during the reception of a telephone call, when it is determined that the user gazes at the portable terminal 100, the portable terminal 100 may perform a control operation for processing a mode of a notification function into a silent mode and outputting the telephone call reception information on the display unit 110.

Meanwhile, according to an embodiment of the present disclosure, operation 250 and operation 260 may be omitted according to a process. For example, according to an embodiment of the present disclosure, when the face of the user has been detected during the detection of the notification event in operation 240, the portable terminal 100 proceeds to operation 270, and may provide a notification function in the silent mode in response to the notification event. When the face of the user has not been detected in operation 240, the operation portable terminal 100 proceeds to operation 280, and may execute a notification function according to a preset notification setting in response to the notification event.

Figure 3:
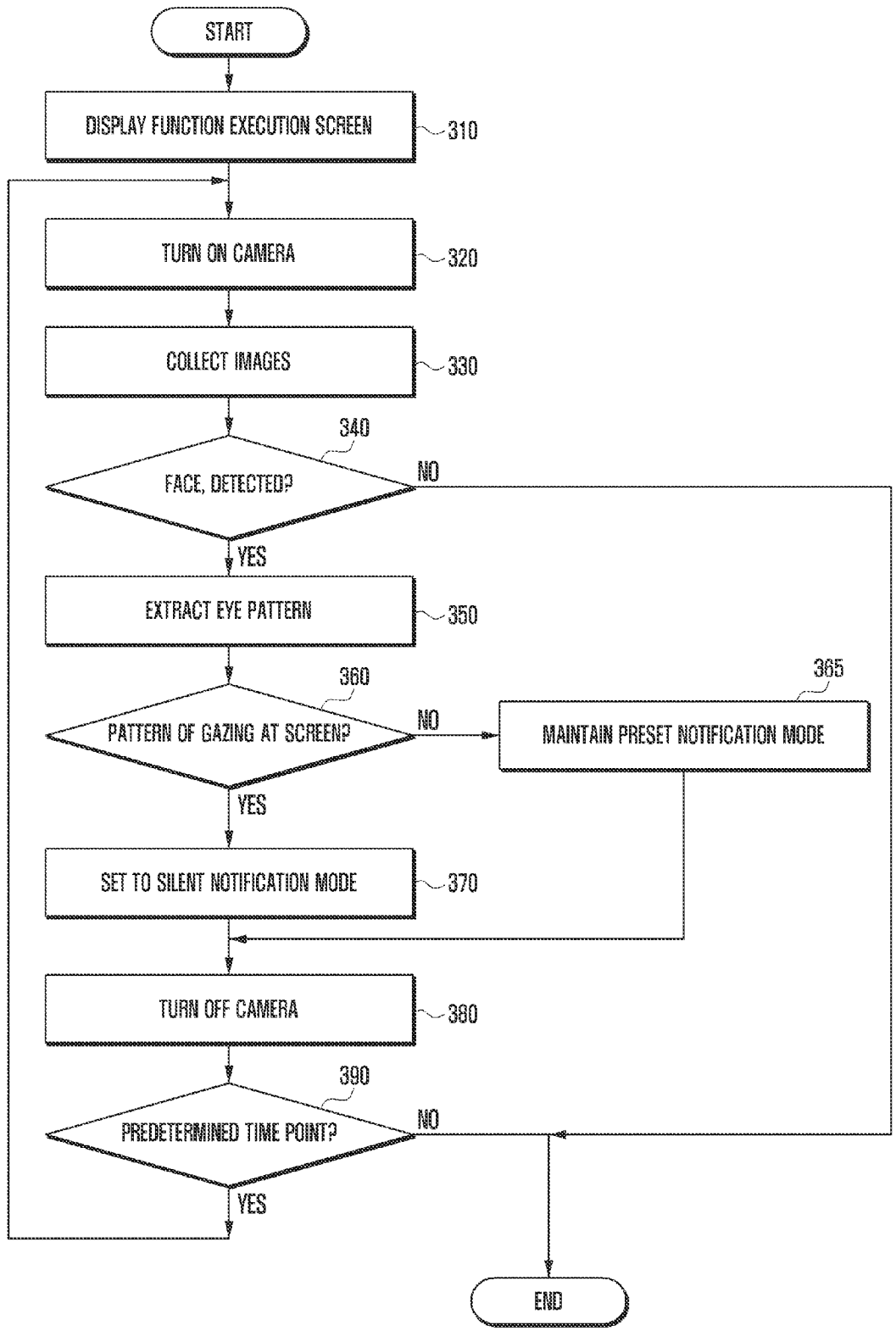
FIG. 3 is a flowchart illustrating a method for operating a notification function in a user device according to a second embodiment of the present disclosure.

FIG. 3 is a flowchart illustrating a method for operating a notification function in a user device according to a second embodiment of the present disclosure.

Referring to FIG. 3, in operation 310, the portable terminal 100 turns on the display unit according to a request from a user or a preset schedule, and displays a function execution screen according to the setting of a function of the portable terminal 100. Here, examples of the function execution screen of the portable terminal 100 may include a home screen, a function execution screen, an execution screen of a particular application, a menu screen, a file reproduction screen, and the like. However, examples of the function execution screen of the portable terminal 100 are not limited thereto, but may include all execution screens required in process of operating the portable terminal 100.

In operation 320, the portable terminal 100 turns on the camera 150 in a state of displaying a function execution screen. At this time, the camera 150 is turned on by using a background function, and delivers an image acquired through a lens to the control unit 170.

In operation 330, the portable terminal 100 acquires an image through the camera 150. In operation 340, the portable terminal 100 determines whether a face of the user is detected from the acquired image. For example, the portable terminal 100 may separate a face area of the user and a background area from the image, which has been acquired through the camera 150, by using color information, contour image information, and a technology such as facial feature tracking and the like. When the face area of the user is detected from the image acquired through the camera 150, the portable terminal 100 may determine that the face of the user has been detected. Otherwise, at operation 360 when the face area of the user is not detected from the image acquired through the camera 150, end processing.

When the face of the user has been detected, in operation 350, the portable terminal 100 recognizes the position of an eye area in the face area of the user, and extracts an eye pattern from the eye area. Here, the eye pattern may be data on the size of each eye, the position of each pupil, and the direction of each pupil.

In operation 360, the portable terminal 100 performs pattern matching based on the extracted eye pattern, and determines whether eyes of the user correspond to an eye pattern of gazing at the portable terminal 100. When it is determined as a result of the pattern matching that the eyes of the user correspond to an eye pattern of gazing at the portable terminal 100, in operation 370, the portable terminal 100 sets a mode of a notification function, that the portable terminal 100 supports, to a silent mode.

For example, a case is described in which another particular function (e.g., moving image reproduction, music reproduction, and the like) is executed in a state where a notification mode of the portable terminal 100 is set to a vibration mode or a ring tone mode. In this case, when it is determined that the user is gazing at the portable terminal 100 in process of operating the portable terminal 100, the portable terminal 100 sets a mode of the notification function to the silent mode. Then, if a notification event (e.g., a message, a telephone call, time notification, and the like) occurs while the user operates the portable terminal 100, the portable terminal 100 may limit effect feedback (e.g., vibration, a ring tone, and the like), and may provide only visual feedback on the display unit 110. Meanwhile, when the notification event occurs, the portable terminal 100 may limit an audio effect, and may generate vibration or may provide the notification function in the silent mode.

Specifically, the user may receive a message while a moving image is being reproduced. When a preset reception notification function is a ring tone mode, an existing portable terminal may output an effect sound notifying of message reception during the reproduction of a moving image, and may output reception information through the display unit 110. In this case, a user may feel that there is no need for the effect sound notifying of the message reception. According to an embodiment of the present disclosure, the user is gazing at the screen of the portable terminal 100 when the user operates the portable terminal 100. Accordingly, the portable terminal 100 may notify of the reception in such a manner as to provide only visual feedback without providing separate effect feedback. The user may recognize the reception of a message through the display unit 110 without the unnecessary vibration and ring tone effects.

When it is determined as a result of pattern matching that the eyes of the user correspond to an eye pattern of not gazing at the portable terminal 100, in operation 365, the portable terminal 100 maintains a preset notification mode. The preset notification mode may be a vibration mode, a ring tone mode, or a silent mode. For example, when a mode of a notification function is set to the ring tone mode, if it is determined that the user is not looking at the portable terminal 100 during the operation of the portable terminal 100, the portable terminal 100 executes the notification function in the ring tone mode. In other words, because the user is not looking at the portable terminal 100, when only visual feedback is provided, the user cannot accurately recognize notification information. In this case, in order to attract a gaze direction of the eyes of the user, the portable terminal 100 may output effect feedback (i.e., a ring tone or an effect sound), and may provide the notification information to the user.

In operation 380, the portable terminal 100 turns off the camera 150. In operation 390, the portable terminal 100 determines whether a predetermined time point for detecting the face of the user has arrived. Here, the predetermined time point may be set when the portable terminal 100 is manufactured, and may change according to a setting by the user. Also, the portable terminal 100 may set a cycle of recognizing the eyes of the user, for example, a cycle of recognizing a gaze direction of the eyes of the user, which is different for each particular application. When the predetermined time point arrives, the portable terminal 100 returns to operation 320, and performs a process for recognizing the eyes of the user. Otherwise, at operation 390 when the portable terminal 100 determines a predetermined time point for detecting the face of the user has not arrived, end processing.

As described above, according to the second embodiment of the present disclosure, the portable terminal 100 determines whether the eyes of the user turn their gaze upon the portable terminal 100, periodically or according to the setting by the user during the operation of the portable terminal 100. When the eyes of the user turn their gaze upon the portable terminal 100, the portable terminal 100 performs a control operation for setting a mode of a notification function to a silent mode. In contrast, when the eyes of the user do not turn their gaze upon the portable terminal 100, the portable terminal 100 maintains the notification function in a predetermined notification mode, and thereby may generate vibration or may provide effect feedback, which outputs a ring tone, and visual feedback which displays telephone call reception information on the display unit 110.

Figure 4:
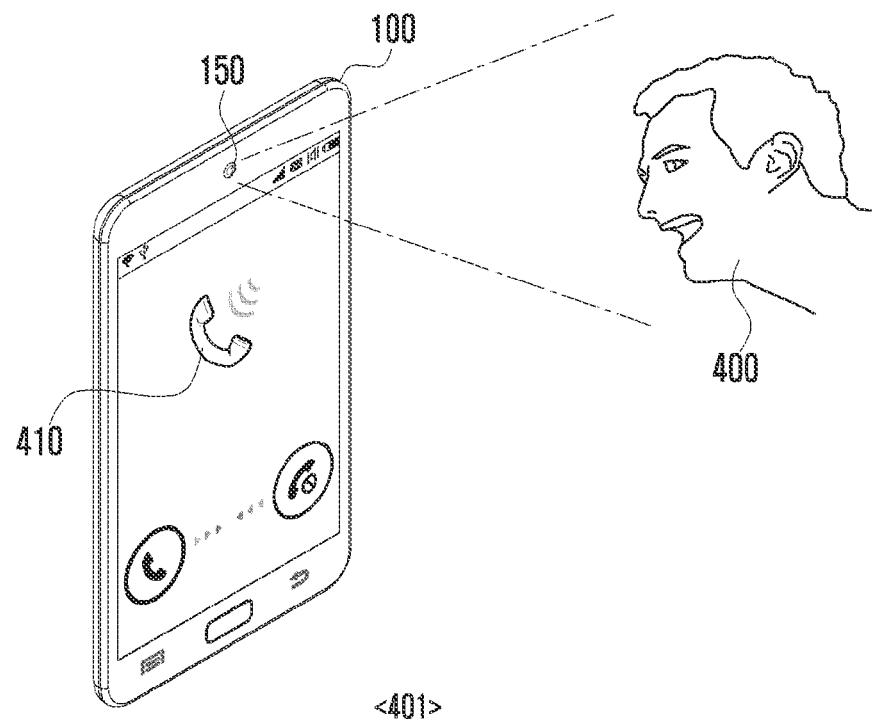
FIG. 4 is a view illustrating an example of a notification function according to an embodiment of the present disclosure.
Figure 4:
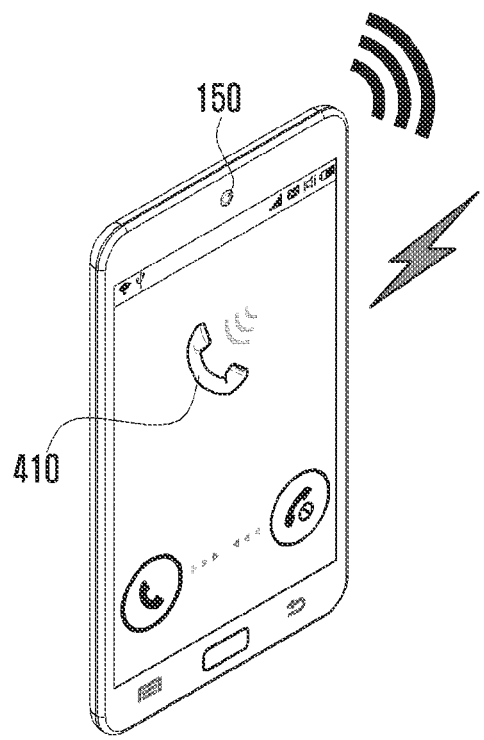

FIG. 4 is a view illustrating an example of reception notification in a user device according to an embodiment of the present disclosure.

Referring to FIG. 4, the portable terminal 100 may receive a telephone call from another portable terminal through the wireless communication unit. In FIG. 4, a case is described in which a mode of a notification function is set to a ring tone mode in the portable terminal 100.

As illustrated in 401 of FIG. 4, when a telephone call is received, the portable terminal 100 detects a face 400 of the user from an image acquired through the camera 150, and may determine, as a result of recognizing eyes of the user, that the user is gazing at the portable terminal 100. Then, the portable terminal 100 determines that the user is looking at the portable terminal 100, and provides reception notification in a silent manner in response to a reception event. Specifically, although a ring tone mode is set for the portable terminal 100, the portable terminal 100 processes a mode of a notification function into a silent mode by limiting an audio output, and provides only visual feedback 410 which outputs telephone call reception information through the display unit 110. Because the user is looking at the screen of the portable terminal 100, the user may recognize the reception of the telephone call through the display unit 110 without a separate ring tone, and may identify the telephone call reception information.

When a telephone call is received, as illustrated in 402 of FIG. 4, the portable terminal 100 may not detect the face of the user in an image acquired through the camera 150. Alternatively, although the portable terminal 100 detects the face of the user, the portable terminal 100 may determine, as a result of recognizing the eyes of the user, that the user is not gazing at the portable terminal 100. Then, the portable terminal 100 determines that the user is not using the portable terminal 100 or is not looking at the portable terminal 100, and provides the user with notification information in a preset ring tone mode in response to a notification event. Specifically, in response to the reception of the telephone call, the portable terminal 100 provides effect feedback (e.g., a ring tone, and the like) and the visual effect 410 which outputs telephone call reception information on the display unit 110. The user may recognize the reception of the telephone call, by hearing the effect feedback, namely, the ring tone, or through the generated vibration, and may identify the telephone call reception information through the display unit 100.

Figure 5:
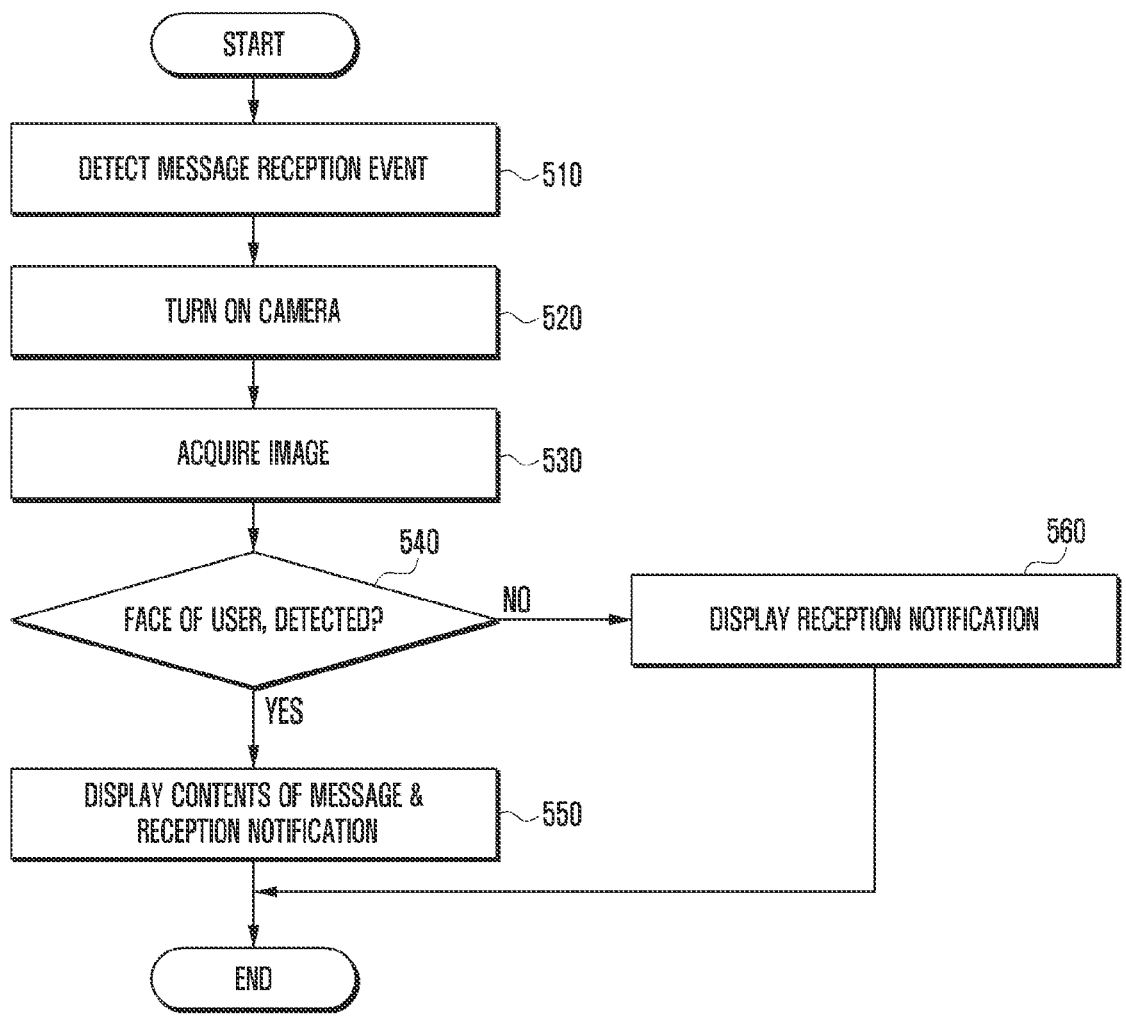
FIG. 5 is a flowchart illustrating a method for operating a notification function in a user device according to a third embodiment of the present disclosure.

FIG. 5 is a flowchart illustrating a method for operating a reception notification function in a user device according to a third embodiment of the present disclosure.

Referring to FIG. 5, in operation 510, the portable terminal 100 may detect a message reception event. Examples of the message reception event may include reception events, such as a Short Message Service (SMS) message, a Multimedia Messaging Service (MMS) message, an e-mail, a Social Networking Service (SNS), feeds (e.g., Facebook and Twitter), and the like.

When the message reception event has been detected, in operation 520, the portable terminal 100 turns on the camera 150. At this time, the camera 150 is turned on by using a background function, and delivers an image acquired through a lens to the control unit 170. In operation 530, the portable terminal 100 acquires an image through the camera 150. In operation 540, the portable terminal 100 determines whether a face of a user is detected from the image acquired through the camera 150. For example, the portable terminal 100 may separate a face area of the user and a background area from the image, which has been acquired through the camera 150, by using color information, contour image information, and a technology such as facial feature tracking and the like. When the face area of the user is detected from the image acquired through the camera 150, the portable terminal 100 may determine that the face of the user has been detected.

When the face of the user has been detected, in operation 550, the portable terminal 100 displays the contents of a message simultaneously with message reception notification information on the display unit 110, in response to the reception of the message. When the face of the user has not been detected, in operation 560, the portable terminal 100 displays message reception notification information on the display unit 110, in response to the reception of the message.

In the third embodiment of the present disclosure, a condition for displaying the contents of a message may further include whether the eyes of the user are gazing at the portable terminal 100. In other words, the portable terminal 100 determines what a gaze direction of the eyes of the user is like during the reception of the message. When it is determined that the eyes of the user are gazing at the portable terminal 100, the portable terminal 100 displays the contents of the message. In contrast, when it is determined that the eyes of the user are not gazing at the portable terminal 100, the portable terminal 100 may display only message reception notification without displaying the contents of the message. In this case, when the message is received, the portable terminal 100 may provide a notification service in the manner of silent notification or in a vibration mode or ring tone mode, according to a recognition pattern of the eyes of the user.

Meanwhile, although not illustrated in FIG. 5, the portable terminal 100 according to an embodiment of the present disclosure may pre-store face information of a particular user of the portable terminal 100. In this case, the portable terminal 100 supports a function of extracting a feature point from a face image of the user acquired through the camera 150, a function of comparing the extracted feature point with the pre-stored face information of the particular user, and a function of determining whether the face of the user received through the camera 150 is a pre-stored face of the particular user. When the received face of the user is the face of the particular user, the portable terminal 100 may perform a control operation for outputting the contents of the message. In contrast, when the received face of the user is not the face of the particular user, the portable terminal 100 may perform a control operation for outputting only message reception information.

Figure 6:
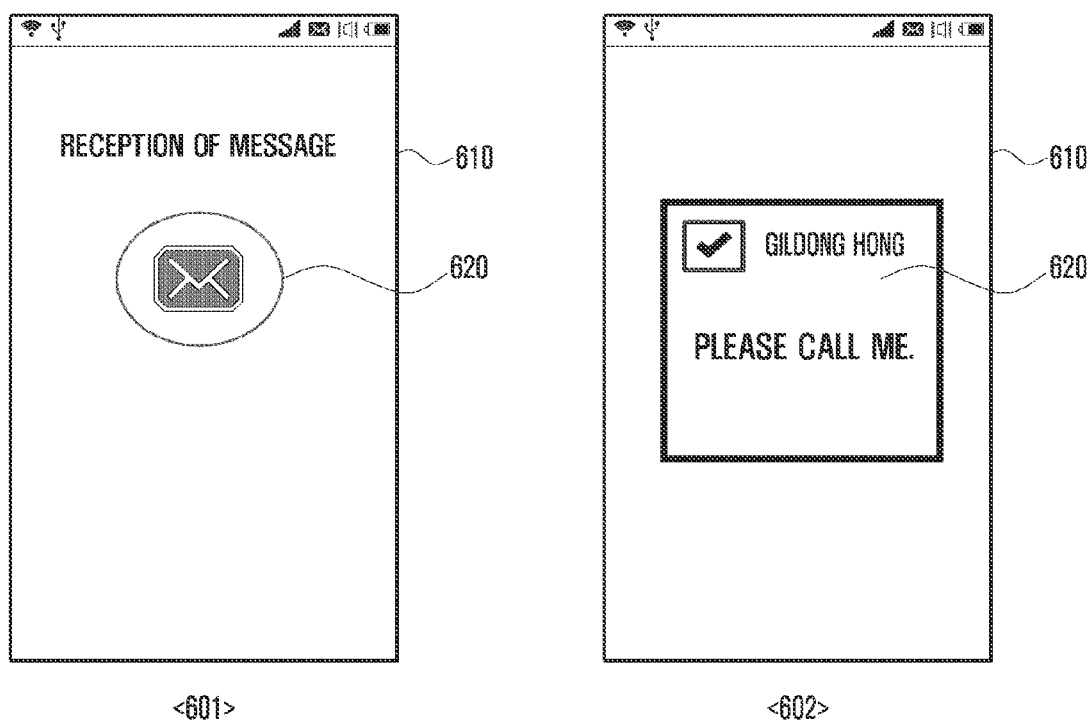
FIG. 6 is a view illustrating an example of a notification function in the case of receiving a message according to an embodiment of the present disclosure.

FIG. 6 is a view illustrating an example of a notification function in the case of receiving a message according to an embodiment of the present disclosure.

Referring to FIG. 6, when receiving a message from another portable terminal through the wireless communication unit 130, the portable terminal 100 may output a message reception screen 610. The portable terminal 100 according to an embodiment of the present disclosure may change the message reception screen 610 according to whether the face of the user is detected through the camera 150 during the reception of the message. Here, the message reception screen 610 may be provided in a pop-up form in such a manner as to overlap another execution screen. Alternatively, the message reception screen 610 may be provided in a full screen form. Alternatively, the message reception screen 610 may be output at a part (e.g., an upper end part, a lower end part, or a central part) of the screen of the display unit 110.

For example, when the face of the user is not detected in an image acquired through the camera 150 during the reception of a message, the display unit 110 may display reception information notifying of the reception of the message or may output a message reception icon 620, as illustrated in 601 of FIG. 6. When the face of the user is detected in the image acquired through the camera 150 during the reception of the message, the display unit 110 may output contents 620 of the message simultaneously with message originator information, as illustrated in 602 of FIG. 6.

Meanwhile, when a face detected in the image acquired through the camera 150 is a pre-stored face of the user (e.g., an owner of the portable terminal 100), the portable terminal 100 displays the contents of the message, according to a setting. In contrast, when the detected face is not the pre-stored face of the user, the portable terminal 100 may operate a function of not displaying the contents of the message, according to the setting.

For example, the portable terminal 100 separates a face area from the image acquired through the camera 150 during the reception of the message, extracts feature points of the face area, compares the extracted feature points of the face area with features points of each pre-stored face image, and thereby may recognize a particular user of the portable terminal 100. When a face of the particular user is detected during the reception of the message, the portable terminal 100 performs a control operation for outputting a screen illustrated in 602 of FIG. 6. In contrast, when the face of the particular user is not detected, the portable terminal 100 performs a control operation for outputting a screen illustrated in 601 of FIG. 6.

Also, according to an embodiment of the present disclosure, the portable terminal 100 may operate a privacy function (e.g., the protection of personal information, and the like) as well as a function of limiting the display of the contents of a message. For example, when a particular function of recognizing a face of the user is set for the portable terminal 100, only if a pre-stored face of the user is recognized in the case of requesting the execution of a function (e.g., a message function, a photograph function, a memo function, a calendar function, and the like), the portable terminal 100 may operate the execution of the relevant function.

Figure 7:
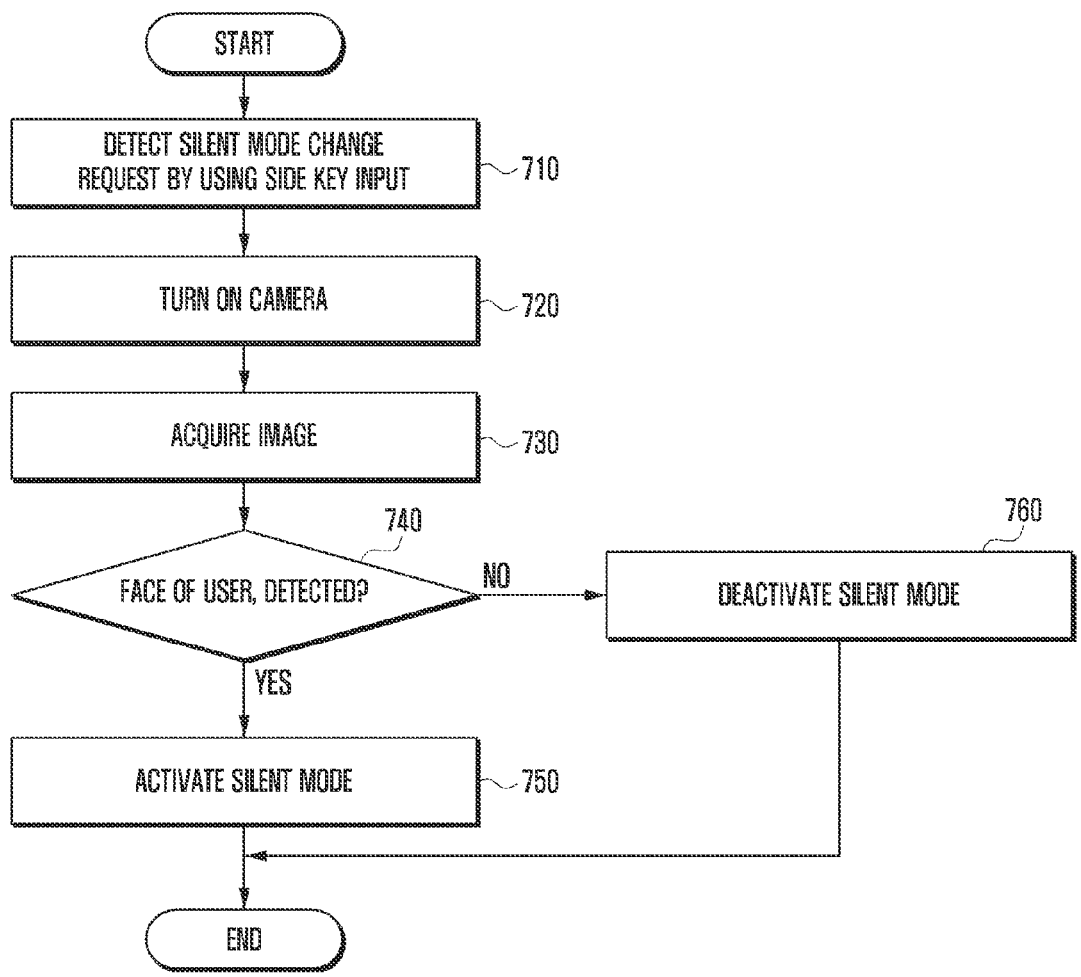
FIG. 7 is a flowchart illustrating a method for operating a notification function in a user device according to a fourth embodiment of the present disclosure.

FIG. 7 is a flowchart illustrating a method for operating a notification function in a user device according to a fourth embodiment of the present disclosure.

Referring to FIG. 7, in operation 710, the portable terminal 100 may detect a silent mode change request by using a side key input at a request from a user. For example, according to an embodiment of the present disclosure, the portable terminal 100 may include a side key, for which a sound volume adjustment is set, mounted on a lateral surface thereof. The user may adjust volume in such a manner as to increase or reduce the volume, by using the side key.

At operation 710, the portable terminal may detect a silent mode changed request by using a side input of the portable terminal 100. When the silent mode change request has been detected, in operation 720, the portable terminal 100 turns on the camera 150. In operation 730, the portable terminal 100 acquires an image through the camera 150. In operation 740, the portable terminal 100 determines whether a face of a user is detected from the image acquired through the camera 150. When the face of the user has been detected from the acquired image, in operation 750, the portable terminal 100 activates a silent mode in response to the silent mode change request. Specifically, when the user adjusts a sound of the portable terminal 100 in operation 710 by adjusting the side key, the portable terminal 100 determines whether the face of the user has been detected through the camera 150. When the face of the user has been detected, the portable terminal 100 activates the silent mode in response to operation 710 according to previously-defined rules.

When the face of the user has not been detected from the acquired image, in operation 760, the portable terminal 100 deactivates the silent mode in response to the silent mode change request. For example, in using the portable terminal 100, a side key may cause the malfunction of the portable terminal 100 contrary to the user's intention. In this case, the portable terminal 100 determines the reliability of the silent mode change request based on whether the face of the user has been detected, and thereby may prevent malfunction in such a manner as to limit a key input which may cause the malfunction. For example, when the user adjusts a sound of the portable terminal 100 in operation 710 by adjusting a side key, if the face of the user is not detected through the camera 150, although an input indicating the activation of a silent mode is detected, the portable terminal 100 may perform a control operation for deactivating the silent mode, because the face of the user has not been detected.

As described above, the method and the apparatus for operating a notification function in the user device have been described with reference to various embodiments of the present disclosure through the description and the accompanying drawings. Although particular terms have been used in the description, the particular terms are only used in a general sense in order to clearly describe the technical contents of the present disclosure and help understanding of the present disclosure, and thus the present disclosure is not limited to the above-described various embodiments. That is, it is apparent to those having ordinary knowledge in the technical field, to which the present disclosure pertains, that various embodiments which are based on the technical spirit of the present disclosure may be implemented.

The user device according to various embodiments of the present disclosure determines whether a face of the user has been detected in an image acquired through the camera during the occurrence of a notification event. When the face of the user has been detected in the acquired image, the user device may execute a silent notification function in response to the notification event. Particularly, when determining that the user is looking at the user device, the user device processes a mode of a function accompanied by notification into a silent mode, and provides only visual feedback. Accordingly, the convenience of the user may be improved.

Also, while the user device operates the notification function in a preset notification mode when it is determined that the user is not looking at the user device, if it is determined that the user is looking at the user device, the user device may limit effect feedback (e.g., the generation of vibration, the output of an effect sound, or the like), and may provide only visual feedback which outputs notification information.

Figure 8:
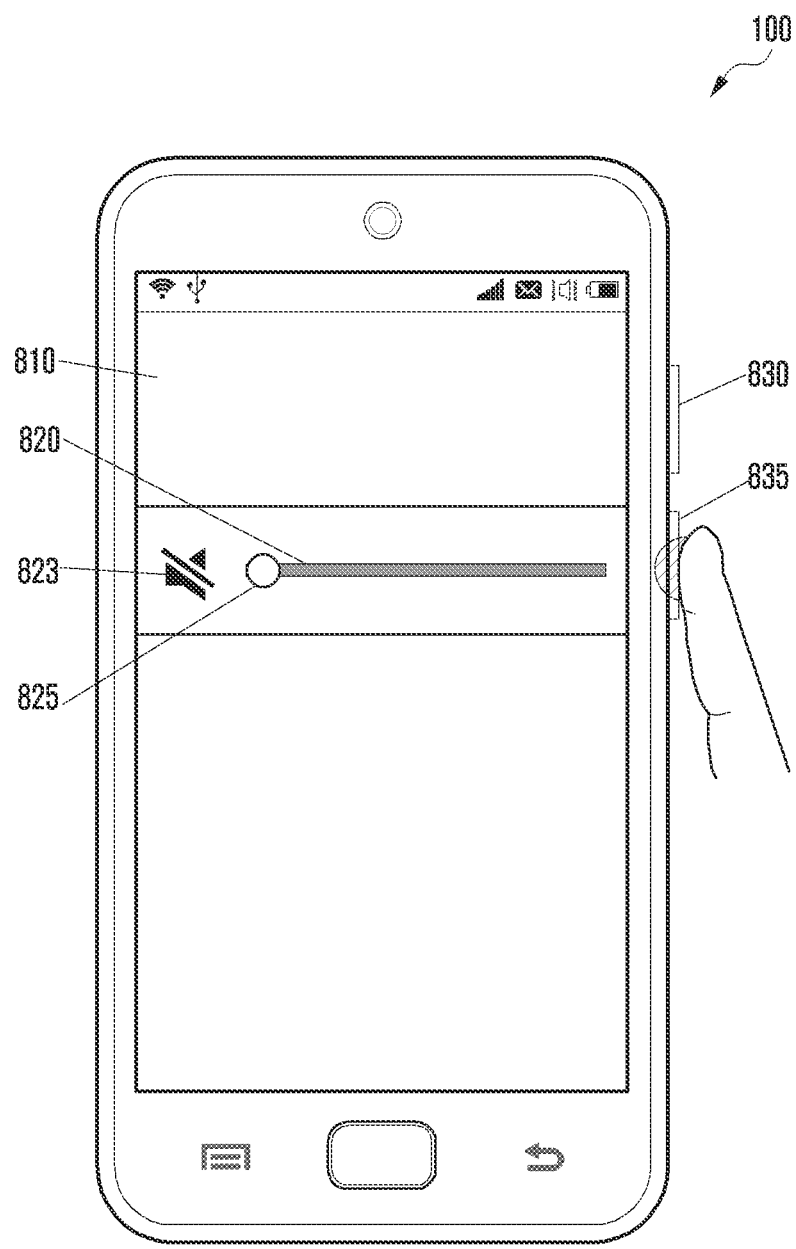
FIG. 8 is a view illustrating an example of a silent mode change request by using a side key input at a request from a user according to an embodiment of the present disclosure.

FIG. 8 is a view illustrating an example of a silent mode change request by using a side key input at a request from a user according to an embodiment of the present invention disclosure.

Referring to FIG. 8, the portable terminal 100 has a plurality of side keys 830 and 835. It will be understood that the side key 830 may increase a volume of the portable terminal 100 and the side key 835 will may reduce the volume of the portable terminal 100. In operation, when a user touches the side key 835 such that a volume menu 810 is displayed on the display of the mobile terminal 100. The volume display 810 includes a slide 820 upon which an indication of current volume 825 slides across. When the side key 835 is pressed until the indication of current volume 825 slides completely to the left, the mobile terminal enters the silent mode change request state indicated by the silent mode 823.

However, when the portable terminal 100 determines whether a face of a user is detected from the image acquired through the camera 150. When the face of the user has been detected from the acquired image, the portable terminal 100 activates a silent mode 823 in response to the silent mode change request. Specifically, when the user adjusts a sound of the portable terminal 100 by adjusting the side key 835, the portable terminal 100 determines whether the face of the user has been detected through the camera 150. When the face of the user has been detected, the portable terminal 100 activates the silent mode 823.

However, when the face of the user has not been detected from the acquired image, the portable terminal 100 deactivates the silent mode in response to the silent mode change request.

Various aspects of the present disclosure may also be embodied as computer readable code on a non-transitory computer readable recording medium. A non-transitory computer readable recording medium is any data storage device that may store data which may be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium may also be distributed over network coupled computer systems so that the computer readable code is stored and executed in a distributed fashion. Also, functional programs, code, and code segments for accomplishing the present disclosure may be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums may also be distributed over network coupled computer systems so that the instructions are stored and executed in a distributed fashion. Also, functional computer programs, instructions, and instruction segments for accomplishing the present disclosure may be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a notification function in a user device, the notification function being configured to notify to the user as a notification mode of an occurrence of a notification event, the method comprising:
- detecting whether the notification event is a reception notification event or a function notification event;
- detecting a face of a user by separating the face area of the user and a background area from each of images collected through a camera and executing an eye pattern from the face area of the user, when the reception or function notification event is detected;
- executing the notification function to either one of a silent mode or a vibration mode from a sound notification mode in response to the detected function notification event, or outputting contents of a message simultaneously with message originator information on a display unit in response to the detected reception notification event, when the face of the user is detected in the images collected through the camera; and
- preventing the notification function from changing to the silent mode by an input of the user when the face of the user is not detected in the images collected through the camera.

2. The method of claim 1, wherein, when the notification event is not detected, the notification function is executed in the preset notification mode.

3. The method of claim 1, further comprising:
when the reception notification event is detected,
- outputting originator information and contents of a message on a display unit, when the face of the user is detected; and
- outputting the reception notification information on the display unit, when the face of the user is not detected.

4. The method of claim 1, wherein, when the face of the user is detected, the detection of the face of the user is determined when a feature point of the face of the user detected through the camera is compared with a feature point of a pre-stored face and it is determined that the feature point of the face of the user is similar to the feature point of the pre-stored face.

5. The method of claim 1, further comprising:
- executing an application supporting the notification function before the notification event is detected;
- wherein a mode of the notification function is changed to one of a silent mode and a vibration mode when the face of the user is detected, and
- wherein the notification function is executed in a preset notification mode when the face of the user is not detected.

6. A user device for operating a notification function, the notification function being configured to notify to the user as a notification mode an occurrence of a notification event, the user device comprising:
- a wireless communication unit configured to transmit/receive one of a call and particular data;
- a camera configured to collect images;
- an audio processing unit configured to output a reception sound; and
- a control unit configured to:
    - detect whether the notification event is a reception notification event or a function notification event,
    - execute the notification function of notifying a user of reception of one of the call and the particular data in either of a silent mode and a vibration mode from a sound notification mode, if a face of the user is detected in response to the detected function notification event by separating the face area of the user and a background area from each of images collected through the camera,
    - execute an eye pattern form the face area of the user, when the reception notification event or the function notification event is detected or output contents of a messaged simultaneously with message originator information on a display unit in response to the detected reception notification event, and
    - prevent the notification function from changing to the silent mode by an input of the user when the face of the user is not detected in the images collected through the camera.

7. The user device of claim 6, wherein the control unit is further configured to perform a control operation to execute the notification function in the preset notification mode, when the notification event is not detected.

8. The user device of claim 6, wherein, when the reception notification event is detected, the control unit is further configured to perform a control operation to output the reception notification information on the display unit when the face of the user is not detected.

9. The user device of claim 6, wherein the control unit is further configured to determine the detection of the face of the user when a feature point of the face of the user detected through the camera is compared with a feature point of a pre-stored face and it is determined that the feature point of the face of the user is similar to the feature point of the pre-stored face.

10. The user device of claim 6, wherein an application supporting the notification function is further executed before the notification event is detected.

* * * * *